(12) United States Patent
Ramini

(10) Patent No.: US 8,074,783 B2
(45) Date of Patent: Dec. 13, 2011

(54) DEVICE FOR POSITIONING AN ARTICLE TO BE WRAPPED

(75) Inventor: Umberto Ramini, Bologna (IT)

(73) Assignee: Sacmi Packaging S.p.A., Imola (IT)

( * ) Notice: Subject to any disclaimer, the term of this patent is extended or adjusted under 35 U.S.C. 154(b) by 287 days.

(21) Appl. No.: 12/278,017

(22) PCT Filed: Feb. 8, 2007

(86) PCT No.: PCT/IB2007/000307
§ 371 (c)(1),
(2), (4) Date: Sep. 24, 2009

(87) PCT Pub. No.: WO2007/091164
PCT Pub. Date: Aug. 16, 2007

(65) Prior Publication Data
US 2010/0050577 A1    Mar. 4, 2010

(30) Foreign Application Priority Data
Feb. 9, 2006 (IT) .............................. BO2006A0078

(51) Int. Cl.
*B65G 47/84* (2006.01)
(52) U.S. Cl. ................ 198/470.1; 198/474.1; 198/478.1
(58) Field of Classification Search .............. 198/470.1, 198/474.1, 478.1, 411
See application file for complete search history.

(56) References Cited

U.S. PATENT DOCUMENTS

| | | | | |
|---|---|---|---|---|
| 2,415,997 A | * | 2/1947 | Eldred | 198/474.1 |
| 4,938,337 A | * | 7/1990 | Jowitt et al. | 198/470.1 |
| 5,988,354 A | * | 11/1999 | Spatafora et al. | 198/411 |
| 7,770,712 B2 | * | 8/2010 | McCabe | 198/478.1 |

FOREIGN PATENT DOCUMENTS

| | | |
|---|---|---|
| EP | 0608823 A | 8/1994 |
| EP | 1357027 A | 10/2003 |
| GB | 2220187 A | 1/1990 |

OTHER PUBLICATIONS

International Search Report.

* cited by examiner

*Primary Examiner* — James R Bidwell
(74) *Attorney, Agent, or Firm* — William J. Sapone; Coleman Sudol Sapone P.C.

(57) ABSTRACT

A device for positioning an article (2) to be wrapped by a machine has a horizontal support body (3) centrally fixed on a vertical rotation shaft (4). The device (1) is equipped with at a least one plier device (5) connected, to turn together with the rotation shaft, to support the body (3), the plier device provided with at least two jaws (6,7). An opening apparatus (8) is connected to at least one of the jaws (6,7) to hold and to release the article (2). The at least one plier device (5) is connected to the support body (3) by a respective rotation device (9) for rotating the at least one plier device (5) and of the article held thereby, around an axis almost radial in respect to the support body (3).

20 Claims, 4 Drawing Sheets

DEVICE FOR POSITIONING AN ARTICLE TO BE WRAPPED

TECHNICAL FIELD

The present invention relates to the packaging field and it refers to a device for positioning an article to be wrapped, for example to transferred, from a conveyor to a lifting and packing means of a wrapping machine, chocolates even very delicate and relatively bulky, such as those chocolate-coated cherry with liqueur also called "boeri" which are traditionally wrapped in a manner aesthetically similar to a candy with a kind of upper twist.

BACKGROUND ART

In the non specialized known wrapping machine, for wrapping various kinds of products such as chocolates, it is necessary to use pliers mounted on vertical axis wheels.

Said known wheels have the drawback to orientate the products in a manner not suitable for the chocolate-coated cherry with liqueur wrapper stile.

Other drawback of said known wheels consists in that their conformation can make impossible the automatic positioning of a wrapping sheet above the product because said known wheels do not leave sufficient space for the members fit for said positioning.

Further drawback of said known pliers wheels consists in that they can have an excessive stressing handling and can lose the handling synchronism with the risks of damaging the articles to be wrapped and of damaging the machine.

DISCLOSURE OF THE INVENTION

An object of the present invention is to propose a device for positioning an article to be wrapped which can be installed on known type wrapping machine for general purpose to carry out also a chocolate-coated cherry with liqueur type wrapper.

Other object is to propose a device able to position the article to be wrapped in such a manner to leave the moving space for the members for the positioning of the wrapping sheet above the articles.

Further object is to propose a device with smooth movements in order to prevent damages of the article to be wrapped and free from the risk to lose the synchronization and the phase of movements.

Further object is to propose a reliable, fast and relatively simple device which is also suitable for wrapping articles of various sizes and nature.

BRIEF DESCRIPTION OF THE DRAWINGS

The characteristics of the invention are highlighted as follows with particular reference to the attached drawings, in which.

BEST MODE OF CARRYING OUT THE INVENTION

Figure 1:
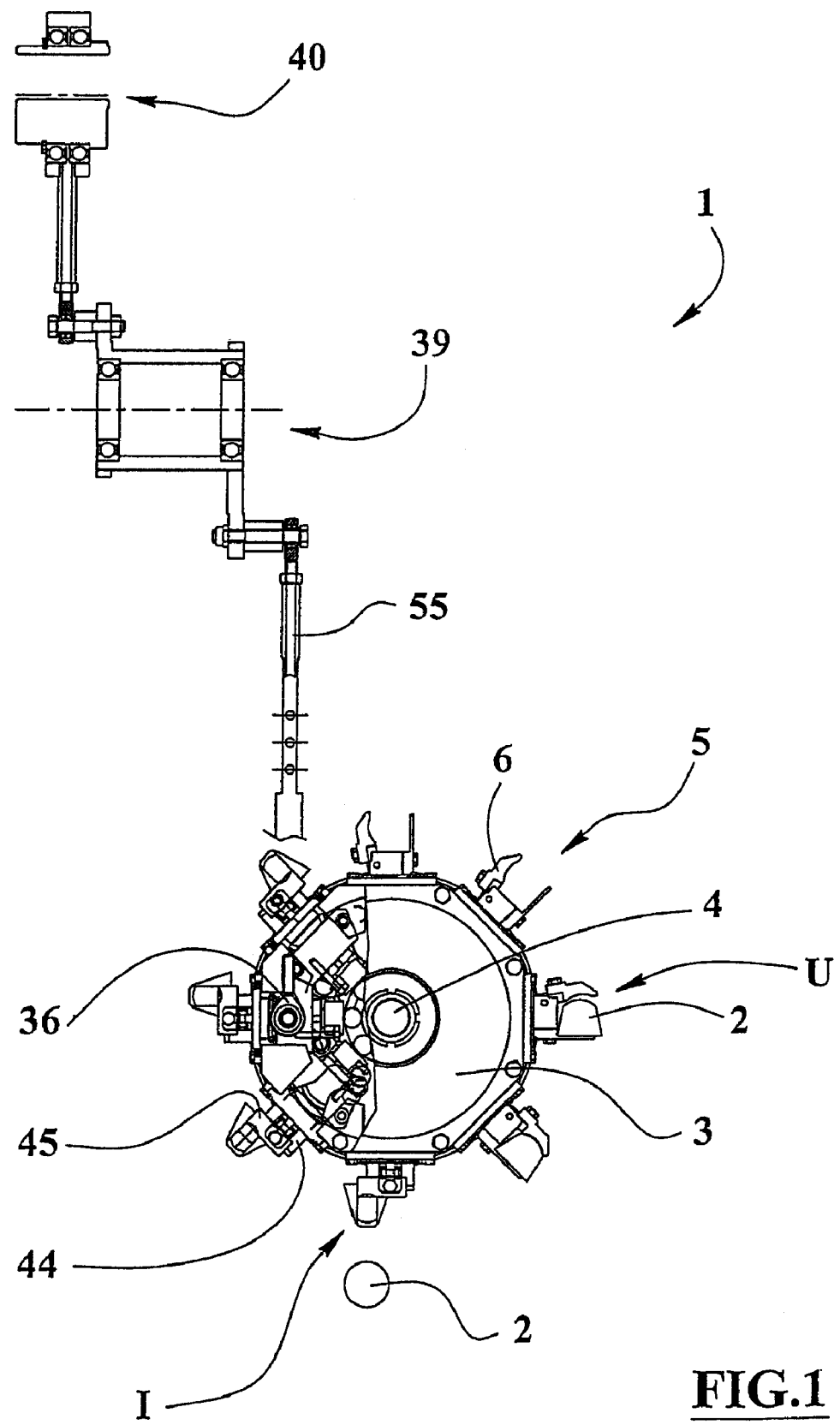
FIG. 1 illustrates a schematic, partial and plain view of the device for positioning an article to be wrapped of the present invention, in which some parts are removed away for better showing others.
Figure 2:
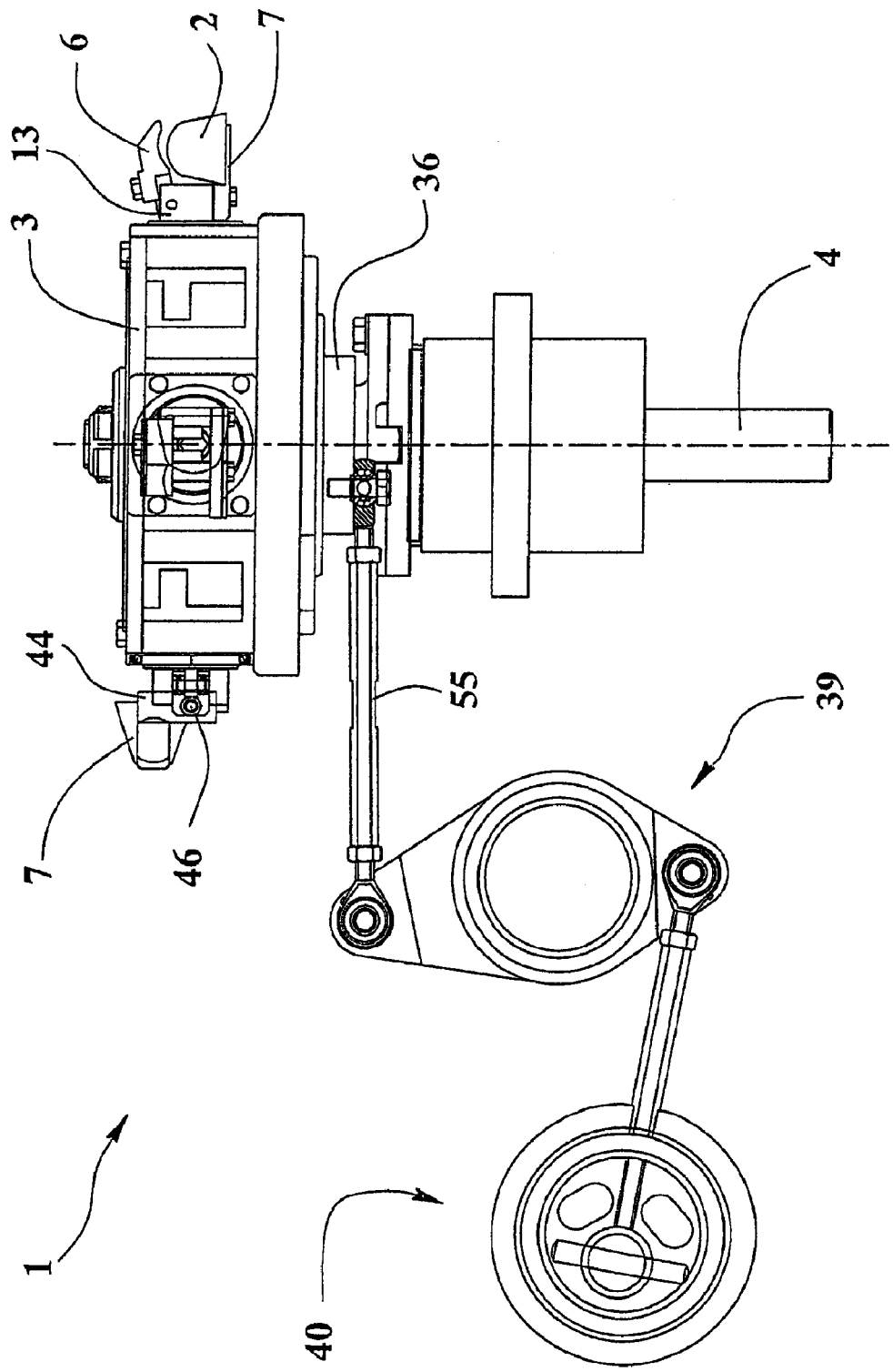
FIG. 2 illustrates a side view of the device of FIG. 1 in which some parts has are removed away to simplify the illustration.
Figure 3:
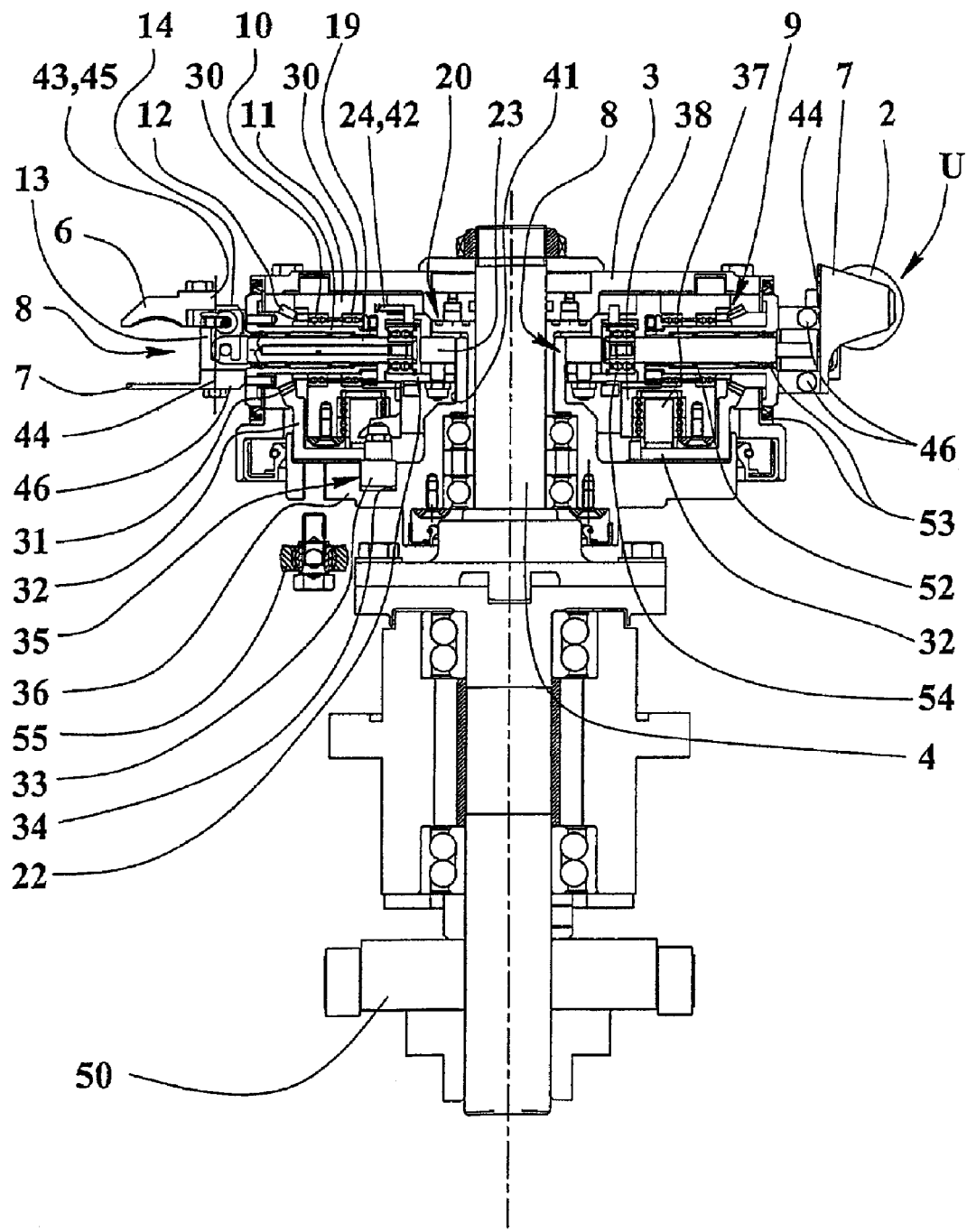
FIG. 3 illustrates a side view of the device of FIG. 1 sectioned by an axial plain.
Figure 5:
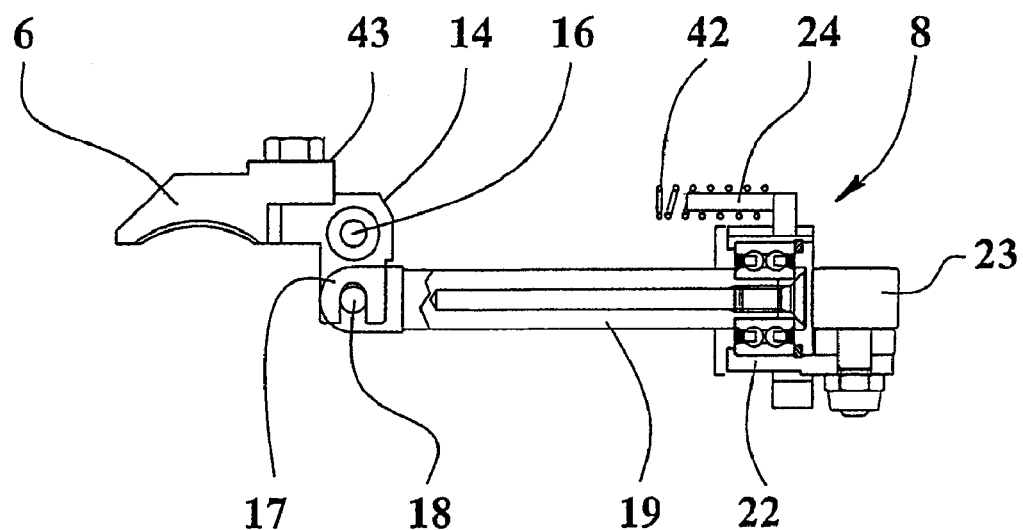
FIGS. 4 and 5 illustrate enlarged views of respective portions of the device of FIG. 3.
Figure 4:
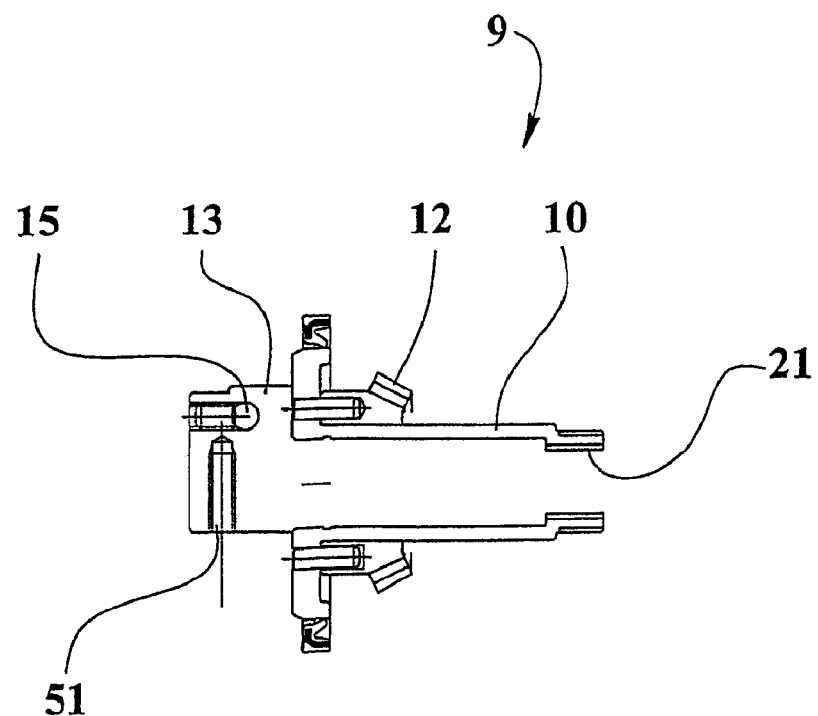

With reference to the FIGS. 1-5, numeral 1 indicates the device for positioning an article 2 to be wrapped.

The article can be, for example, a chocolate-coated cherry with liqueur also called "Boero" and it can be positioned by the device 1 to be transferred to a wrapping machine, of known type and now shown, fit to carry out the chocolate-coated cherry with liqueur type and/or various types of wrapper. The device 1, for example, can be used as vertical axis wheel in said known machines.

In alternative the device, appropriately driven, can be associated to a specialized machine or interposed between two machines or between a conveyor and a wrapping machine, not shown.

In general, the device can be used for many kinds of products, foods and non-food, and can be used also in machine different from the wrapping machine. The device 1 comprises a support body 3, disposed horizontally, having shape approximately discoidal or, as shown in the drawings, having upright polyhedron shape with regular base.

The support body 3 is centrally fixed, for example by means of connection with a vertical rotating shaft 4 whose lower portion has a gear means 50 for the rotation motion to transfer it to the rotation shaft 4. In alternative this latter shaft can be provided with a intermittent drive 50 for a predetermined circular motion law of the shaft.

The device 1 is equipped with eight pliers means 5, said number can vary from four to sixteen or more. Said pliers means are connected, to turn with it, to the support body 3 whose dimensions are related to the number of said pliers means. Each of the pliers means is provided with two jaws 6, 7 shaped to match with opposite faces of the article to be wrapped for example, as shown, with the upper convex end and the main plain base of a chocolate-coated cherry with liqueur.

Each of the pliers means 5 is equipped with respective opening means 8 to hold and to release the article 2 and is connected to the support body 3 by means of respective rotation means 9.

Said rotation means 9 are provided to rotate the respective pliers means 5 and the article held thereby around an almost radial axis, that is horizontal, and that crosses the axis of the shaft 4.

The rotation means 9 of each pliers means 5, comprise a rotating element 10 connected to the support body 3 by means of a first connection means 11 provided with bearings 30 for the free rotation of said rotating element 10 around the radial axis.

The rotating element 10 is provided with transmission means 12 for the motion around the radial axis and has support means 13 for the pliers means 5 to which they transmit said rotary motion.

Each first jaw 6, fit to match the upper convex end of the chocolate-coated cherry with liqueur, is fixed to an external end of a "L" shaped arm 14 centrally hinged by means of a first pivot 16 and provided, at the opposite end, with a first joint 17 with open slots for a second joint 18 pin shaped with ends engaged into the slots, of an external end of the rod means 19 of the opening means 8, axially driven by the first cam means 20.

The first pivot 16 of the shaped arm 14 is engaged in a hole 15 of the support means 13 of the rotating element 10.

The second jaw 7, fit to match with the main base support of the chocolate-coated cherry with liqueur, or of the article to be wrapped, is fixed by means of screws to a threaded hole 51 of the support means 13 rigidly connected to the rotating element 10.

In alternative, the invention provides that also second jaw 7 can be oscillating and driven by the rod means 19 of the opening means 8. In said alternative, the opening and the closing of the pliers means 5 are carried out by the movement of mutual distancing and approach of both jaws 6, 7.

The rod means 19 is sliding within an axial cavity 21 of the rotating element 10. Said axial cavity 21 can be equipped with sliding and/or rotation means 52, for example comprising bushing and/or bearings, for the rod means sliding at low friction. The inner and external edges of the external end of the rotating element 10 can be equipped with respective flap seals 53 to avoid the entry of powder or dirt.

The inner end of each rod means 19 of the opening means 8 is connected, in free rotating manner, by means of bearings 54 to a coupling means 22 having a idle wheel 23 engaged to the first cam means 20.

The coupling means 22 is prevented to rotate together with the rotating element 10, and is constrained to translate in radial way, by a radial pin 24 fixed to the coupling means 22 and sliding in a housing, not shown, integral with the support body 3 or, in alternative, vice versa.

The transmission means 12 of the rotating element 10 comprise a first gear wheel engaged with a respective gear sector 31 fixed to an end of a respective oscillating arm 32, whose remaining end has an idle wheel 33 constrained between the sidewalls of a groove 34 of second cam means 35 and carried out in a rotating member 36 coaxial in respect to the rotation shaft 4.

The first gear wheel of the transmission means 12 and the respective gear sector 31 are conical.

The oscillating arm 32 is centrally hinged, by means of a respective oscillation pivot 37 to a second connection means 38 rigidly fixed to the support body 3.

The first cam means 20 comprise a profiled wall 41, having ring-closed surface, in other words a tubular shaped profiled wall, with upright generatrix parallel in respect to the axis of the rotation shaft 4. The profiled wall 41 matches the idle wheel 23 that is external to said wall 41, this latter being carried out in the rotating member 36 around and in parallel manner to the rotation shaft 4.

The radial pin 24 serves as spring guiding for a spring means 42, for example of metallic helical type, compressed between the coupling means 22 and the support body 3.

The device 1 can comprise a second spring, not shown, dislocated in opposite position of the spring means in respect to the rod means 19.

Said second spring acts concordantly with the spring means 42, between the coupling means 22 and a fixed point in respect to the disc support body.

The second spring and the spring means cooperate to generate a resulting force acting on the axis of the rod means 19.

Said conformation of the first cam means 20, of the coupling means 22, of the spring means and of the second spring, acts in a manner that the closure force of each pliers means 5, or of each first jaw 6, is produced by said spring means 42 and second spring that therefore set the maximum closing force of the jaw allowing also to compensate eventual differences of height of the product.

Obviously in the case in which only the spring means 42 is used, without the second spring, the closing force of the first jaw 6 is determined by the elastic force of the respective spring means 42.

The rotating member 36, in which are carried out the cam means first 20 and second 35, is connected by means of a connecting rod 55 to a balance means 39 and by means of this latter balance means, to a rod and crank actuator 40, or of cam type, which move it with an alternate rotary motion.

Obviously the rotary motion of the rotating member 36 can be driven by various means independent from or connected to the shaft 4.

The jaws 6, 7 are equipped with respective side joints 43, 44 respectively for the shaped arm 14 and the support means 13 of the rotating element 10.

The side joints 43, 44 are provided with fastener 45, 46 for the connection to the shaped arm 14 and to the threaded hole 51 of the support means 13 of the rotating element 10. The side joints 43, 44 are elongated to laterally offset the jaws 6, 7 in respect to the radial rotation axis of the respective rotating element 10.

Said constant lateral offset is ranging from one sixth to the quadruple of the maximum dimension of the article 2 and allows to raise this latter in the outlet position U to allow some members, not shown, of the wrapping machine to put above a wrapping sheet without interfere with the volume occupied by the device 1.

A possible operation of the device 1 provides that the opening and the closing of the jaws and their rotation around the respective radial axis is controlled, by means of the profiles of the cam means, first 20 and second 35, by the rod and crank actuator 40 in synchronic manner but independent from the rotation of the shaft 4 allowing the opening and the closing of the jaws, and eventually their rotation around the respective radial axes, also when the support body is immobile.

The article 2, with the support base positioned on a conveyor, not shown, is carried to this latter until to a predetermined inlet position facing one of the pliers means 5.

In said inlet position, the support body 3 is immobile, the pliers means 5 is opened by the opening means 8 and the jaw 7, fit to match with the main support base of the article, is in lower horizontal position. In said condition in the inlet position, a pusher, known but not shown, pushes the article on the lower jaw 7 and under the remaining opened upper jaw.

The closure of the pliers means, carried out by the opening means 8 with the rotation towards the bottom of the first jaw 6, causes the taking of the chocolate-coated cherry with liqueur which is thus rotated around the vertical axis of the support body, for example at 90°, and around the radial axis. This latter rotation, due to the offset of the jaw means in respect to the rotating element 10, as seen, provokes the raising of the product allowing it to match with the wrapping sheet.

An advantage of the present invention is to provide a device for positioning an article to be wrapped which can be used on known wrapping machines for general purpose to carry out a wrapper of chocolate-coated cherry with liqueur type.

Other advantage is to provide a small device which leaves the space for the members fit for the positioning of the wrapping sheet above the article to be wrapped.

Further advantage is to provide a device with smooth movements in order not to damage the product to be wrapped and without any risk to lose the handling synchronism and the handling phase.

Other advantage is to provide a reliable, fast and relatively simple device to be used in various kinds of machines for handling the products, foods and non-food.

The invention claimed is:

1. Device for positioning an article (2) to be wrapped by a machine comprising:
   a support body (3) centrally fixed on a vertical rotation shaft (4), the device (1) being equipped with at least one pliers means (5) connected to the support body (3) to turn together with the support body (3), the at least one pliers means provided with at least two jaws (6, 7) opening means (8) connected to at least one of the jaws (6, 7) for moving the at least one pliers means to hold and to release the article (2), the at least one pliers means (5) being connected to the support body (3) by means of respective rotation means (9) for the rotation of said at least one pliers means (5) and of the article held thereby, around an axis almost radial in respect to the support body (3), such that when the article is in a predetermined inlet position facing the at least one pliers means (5), the article is positioned between opened jaws (6, 7) of said pliers means, said jaws hold the article following closure of the at least one of the jaws (6, 7) operated by the opening means (8); the support body (3) and the rotation means (9) rotate the at least one pliers means (5) and the article (2) respectively around a vertical axis and a radial axis of the support body until the article reaches a predetermined position and a predetermined outlet orientation; such that when said position and orientation are reached, the opening means (8) open the at least one of the jaws (6, 7) releasing the article, and, wherein at least one first jaw (6) is hinged to one end of a shaped arm (14) by a first pivot (16), an opposite end of the shaped arm (14) forming a first joint (17) with a second joint pin (18) provided on an external end of a rod means (19), the rod means axially driven by first cam means (20).

2. Device according to claim 1 wherein the rotation means (9) comprise a rotating element (10) connected to the support body (3) by means of a first connection means (11) provided with bearings (30) for the free rotation of said rotating element (10) around a radial axis; said rotating element (10) having transmission means (12) for moving the rotating element around the radial axis and transmitting said rotary motion to the support means (13) for the pliers means (5).

3. Device according to claim 1 wherein the shaped arm (14) is centrally hinged at a hole (15) for the first pivot (16) of the support means (13) of the rotating element (10).

4. Device according to claim 2 wherein at least one jaw (7) of the at least one pliers means is fixed to the support means (13) of the rotating element (10).

5. Device according claim 1 wherein the rod means (19) are axially slidable within an axial cavity (21) of the rotating element (10).

6. Device according to claim 1 wherein an inner end of the rod means (19) of the opening means (8) is connected by bearings in a free rotating manner to a coupling means (22) having an idle wheel means (23), engaged to first cam means (20), and constrained to translate in a radial direction by at least one radial pin (24) fixed to said coupling means (22) and sliding in a housing integral with the support body (3).

7. Device according to claim 2 wherein the transmission means (12) of the rotating element (10) comprise a first gear wheel engaged to a respective gear sector (31) fixed to an end of a respective oscillating arm (32) whose remaining end has an idle wheel (33) constrained between sidewalls of a groove (34) of a second cam means (35) in a rotating member (36) coaxial in respect to the rotation shaft (4).

8. Device according to claim 7 wherein the oscillating arm (32) is centrally hinged, by means of a respective oscillation pivot (37) to a second connection means (38) rigidly fixed to the support body (3).

9. Device according to claim 1 wherein the first cam means (20) comprise a profiled annular wall (41) matching an idle wheel (23) located external to said wall (41) provided, around and parallel with the rotation shaft (4), in a rotating member (36) coaxial with respect to the rotation shaft (4).

10. Device according to claim 6 wherein the radial pin (24) serves as a guide for a spring means (42) compressed between the coupling means (22) and the support body (3).

11. Device according to claim 1 wherein the spring means (42) determines a closing force of the first jaw (6) on the product.

12. Device according to claim 7 wherein the rotating member (36) of the second cam means (35), is connected, by balance means (39), to a rod and crank actuator (40) which rotate the second cam means in an alternate motion.

13. Device according to claim 1 wherein the first cam means is engaged with a rotating member (36).

14. Device according to claim 2 wherein the jaw (6) has a side joint (43) for joining to the support means (13) of the rotating element (10).

15. Device according to claim 14 further comprising a fastener (45) for connecting the side joint (43) for fixing the side joint to a shaped arm (14) of the support means (13), the side joint elongated to laterally offset the jaw (6, 7) in respect to a radial rotation axis of the rotating element (10), the offset being from one sixth to four times a maximum dimension of the article (2).

16. Device according to claim 1 wherein the device has at least four pliers means (5).

17. Device according to claim 1 wherein the support body (3) has a discoidal or cylindrical shape and is horizontally positioned.

18. Device according to claim 1 wherein the jaw (7) has a side joint (44) for joining to the support means (13) of the rotating element (10).

19. Device according to claim 1 wherein the device has at least eight pliers means (5).

20. Device for positioning an article (2) to be wrapped by a machine comprising:

a support body (3) centrally fixed on a vertical rotation shaft (4), the device (1) being equipped with at least one pliers means (5) connected to the support body (3) to turn together with the support body (3), the at least one pliers means provided with at least two jaws (6, 7) opening means (8) connected to at least one of the jaws (6, 7) for moving the at least one pliers means to hold and to release the article (2), the at least one pliers means (5) being connected to the support body (3) by means of respective rotation means (9) for the rotation of said at least one pliers means (5) and of the article held thereby, around an axis almost radial in respect to the support body (3), such that when the article is in a predetermined inlet position facing the at least one pliers means (5), the article is positioned between opened jaws (6, 7) of said pliers means, said jaws hold the article following closure of the at least one of the jaws (6, 7) operated by the opening means (8); the support body (3) and the rotation means (9) rotate the at least one pliers means (5) and the article (2) respectively around a vertical axis and a radial axis of the support body until the article reaches a predetermined position and a predetermined outlet orientation; such that when said position and orientation are reached, the opening means (8) open the at least one of the jaws (6, 7) releasing the article, wherein the rotation means (9) comprise a rotating element (10) connected to the support body (3) by means of a first connection means (11) provided with bearings (30) for the free rotation of said rotating element (10) around a radial axis; said rotating element (10) having transmission means (12) for moving the rotating element around the radial axis and transmitting said rotary motion to the support means (13) for the pliers means (5), and, wherein the transmission means (12) of the rotating element (10) comprise a first gear wheel engaged to a respective gear sector (31) fixed to an end of a respective oscillating arm (32) whose remaining end has an idle wheel (33) constrained between sidewalls of a groove (34) of a second cam means (35) in a rotating member (36) coaxial in respect to the rotation shaft (4).

* * * * *